3,682,883
PROCESS FOR EXTRACTION OF
SOLANUM ALKALOIDS
Humberto Flores Beltran, Mexico City, Mexico, assignor to G. D. Searle & Co., Chicago, Ill.
No Drawing. Filed Feb. 12, 1970, Ser. No. 10,994
Int. Cl. C07c 47/18
U.S. Cl. 260—210 R        11 Claims

ABSTRACT OF THE DISCLOSURE

Extraction of Solanum plants, preferably in the dry state, with an aqueous alcoholic solution containing 50–70% of the alcohol followed by basification of the resulting solution and extraction of the resulting precipitate affords an excellent yield of Solanum glycoalkaloids, e.g. solasonine, solamargine, demissine and tomatine, in a high state of purity. Suitable alcohols are ethanol, propanol and isopropanol.

---

The present invention is concerned with a novel process for the isolation of valuable glycoalkaloids from naturally occurring sources and, more particularly, relates to a process for extracting Solanum glycoalkaloids, e.g. solasonine, solamargine, demissine and tomatine, from Solanum plants.

The aforementioned Solanum glycoalkaloids are of great interest in view of their facile conversion to the corresponding aglycones, which are valuable starting materials for the manufacture of commercially important steroidal hormonal derivatives. Acid hydrolysis of those glycoalkaloids thus affords the corresponding aglycones. In that manner, solasonine and solamargine are converted to solasodine, demissine to demissidine and tomatine to tomatidine. Solasodine, for example, is converted to $3\beta$-hydroxypregna-5,16-dien-20-one according to the method described by Sato, Latham and Mosettig, J. Org. Chem., 22, 1496 (1957). That substance is useful as an intermediate in the manufacture of progesterone, as is reported by Butenandt and Schmidt-Thome, Ber., 71, 1487 (1937). Similarly, Sato, Katz and Mosettig, J. Am. Chem. Soc., 74, 538 (1962) describe the preparation of $3\beta$-hydroxy-$5\alpha$-pregn-16-en-20-one from tomatidine by the successive steps of heating with acetic anhydride, oxidation and hydrolysis. That intermediate has been converted to progesterone according to the method described by Camerino, Alberti and Vercellone, Gazz., 83, 795 (1953) and by Tuzson, Bulcsu and Kertesz, Hungarian Pat. 142,971.

The valuable glycoalkaloids obtained by the process of this invention are found throughout the Solanum family. Representative species of that family are *Solanum laciniatum*, *Solanum astroitees* Forst, *Solanum atriplicifolium*, *Solanum aviculare*, *Solanum auriculatum*, *Solanum gracile*, *Solanum heterophyllum*, *Solanum luteum*, *Solanum nigrum*, *Solanum sodomeum*, *Solanum tuberosum*, *Solanum verbscifolium* and *Solanum demissum*.

Various methods for the isolation of Solanum glycoalkaloids are known in the prior art. The extraction of tomatine from *Solanum demissum* by means of aqueous acid is described by Schreiber et al., Z. Naturforsch., 186, 471 (1963). The isolation of solasonine by the use of aqueous acid such as acetic acid, nitric acid or sulfuric acid is disclosed, respectively, by Schreiber and Hammer, Tagunsber. Deut. Akad. Landwirschaftswiss. Berlin, 27, 471 (1961); Szasz, Acta. Pharm. Hung., 31, 211–214 (1961) and Syhora, Czech Pat. 96,718, Sept. 15, 1960. The use of an aqueous solution containing sulfur dioxide is reported by Miramontes and Flores, U.S. Pat. 3,385,844, issued May 28, 1968.

The use of aqueous mixtures containing high concentrations of certain alcohols is described in the aforementioned Schreiber et al., Z. Naturforsch., 186, 471 (1963) article. In that publication, the authors disclosed the use of 90% aqueous methanol and 80% aqueous ethanol.

In the conduct of the instant process it has been determined that aqueous solutions containing certain alcohols in the concentration range of 50–70% are especially suitable for the extraction of Solanum glycoalkaloids. Alcohols suitable for this purpose are those containing more than one and less than four carbon atoms, i.e. ethanol, propanol and isopropanol. Methanol is undesirable because of its low solvent power for the glycoalkaloids. This process thus provides many advantages over those previously known and described. Following the extraction period, the insoluble solid residue is separated from the mixture by filtration. This filtration proceeds much more rapidly in the case of the process of this invention. The resulting saving of time is, of course, of great commercial significance in view of the marked reduction in overhead costs. The concentration of the alcohol in the extracting solvent is critical, however, and has been found to be optimal in the 50–70% range. The extracting solvent of 50% alcohol concentration is especially preferred, particularly in view of its lower cost. The criticality of that variable results from the fact that, in addition to the desired glycoalkaloids, the Solanum fruits contain water-soluble components such as pectins and alcohol-soluble components such as waxes. When the alcohol concentration is greater than 70%, appreciable quantities of waxes are thus extracted, while concentrations below 50% result in extraction of the undesired pectins. The presence of these impurities contributes to poor, less convenient and slower filtration, and also results in a product of lower purity. The effect of the alcohol concentration on the yield of glycoalkaloids is demonstrated by the following data:

| Ethanol concentration (percent): | Recovery of pure glycoalkaloids (percent) |
|---|---|
| 30 | 68.8 |
| 40 | 80.9 |
| 50 | 89.7 |
| 60 | 85.8 |
| 70 | 87.9 |
| 80 | 80.9 |

Still another advantage of the present process over known methods results from the fact that it is carried out with a neutral extracting solvent. It therefore follows that considerably smaller quantities of base are required in the precipitation step, thus effecting another economy. Moreover, smaller quantities of the alcohol are required to extract the precipitated material, effecting still an additional saving. It has been determined that the glycoalkaloid content of the lime precipitate produced by the instant process is about 30–50% as compared to 10–15% for those precipitates produced by acid extraction procedures.

The glycoalkaloids produced by the present process are obtained in a high state of purity—due in part to the lower content of water-soluble impurities—thus can be hydrolyzed directly to the desired alkaloids without further purification. In that way, the cost of the instant process is lowered still further.

Further advantages of the present process stem from the fact that the use of corrosive substances such as the aforementioned inorganic acids and noxious gases such as sulfur dioxide are avoided. Avoidance of such corrosive materials obviates the need for special equipment such as glass-lined vessels, thus resulting in further savings. Potential hazard to persons carrying out the process is likewise avoided.

In carrying out the instant process, it has been determined that a volume to weight ratio of 5 parts of solvent for each part of fruits is particularly suitable. Mechanical stirring during the extraction is not essential, but is preferred. The temperature range of 15–30° C. is preferred and room temperature is especially convenient. Higher temperatures provide no advantage and temperatures as high as 50° C. actually result in products of lower purity.

After completion of the extraction, the solid and liquid phases can be separated either by filtration or by centrifugation. The filtrates are stripped of substantially all of the alcohol and are heated to approximately 75–80° C., then are neutralized with a suitable base. Suitable bases are, for example, calcium hydroxide, magnesium hydroxide and sodium hydroxide. It has been found, however, that optimum yields and purity are obtained when calcium hydroxide is employed. The desired glycoalkaloids are obtained from the resulting precipitates by extraction with ethanol.

The invention will appear more fully from the examples which follow. These examples are given by way of illustration only and are not to be construed as limiting the invention either in spirit or in scope as many modifications both in materials and methods will be apparent from this disclosure to those skilled in the art. Temperatures are given in degrees centrigrade (° C.) and quantities of materials in parts by weight unless otherwise noted.

EXAMPLE 1

1000 parts of sliced, dried *Solanum laciniatum* fruits are ground in a Wiley mill using a 2.0 mm. mesh screen. To that material is added 5000 parts by volume of a 1:1 ethanol-water solution and the resulting mixture is stirred at room tempearture for about 4 hours. At the end of that period the solids are allowed to settle and the supernatant is decanted and filtered through a layer of diatomaceous earth. The residual solids are extracted twice more with 5000 parts by volume quantities of 1:1 ethanol-water in the same manner as before and the resulting solutions are isolated by filtration.

The combined filtrates are distilled to remove ethanol and 40–50 parts of powdered lime is added with stirring, thus effecting a pH of 10–11. The resulting mixture is stored for about 16 hours at room temperature, then is filtered. The filter cake is dried at 60–70°, then is extracted 4–5 times with refluxing ethanol and the extracts thus obtained are filtered, then evaporated to dryness to afford the desired Solanum glycoalkaloids. A determination of the purity of the latter material reveals that 89.7% of the glycoalkaloids contained in the plant is recovered.

EXAMPLE 2

The procedure of Example 1 is repeated with the exception that *Solanum aviculare* var. *latifolium* is used. The desired Solanum glycoalkaloids are likewise obtained.

EXAMPLE 3

When the procedure of Example 1 is repeated with the modification that either 60% or 70% aqueous ethanol is used as the extracting solvent, the desired Solanum glycoalkaloids are likewise obtained. The recovery rate is 85.8% in the case of the 60% extraction and 87.9% in the case of the 70% extraction.

EXAMPLE 4

The use of 50% aqueous isopropanol in the procedure of Example 1 results in a recovery rate of 83.6% of the desired Solanum glycoalkaloids.

What is claimed is:

1. In a process for extracting Solanum glycoalkaloids from Solanum plants, the improvement which consists of extracting Solanum glycoalkaloids from Solanum plants by means of an aqueous alcoholic solution consisting of 50–70% of an alcohol possessing more than 1 and less than 4 carbon atoms and 30–50% water.

2. As in claim 1, the improvement which consists of extracting Solanum glycoalkaloids from Solanum plants by means of 50–70% aqueous ethanol.

3. As in claim 1, the improvement which consists of extracting Solanum glycoalkaloids from Solanum plants at 15–30° C. by means of 50% aqueous ethanol.

4. As in claim 1, the improvement which consists of extracting Solanum glycoalkaloids from Solanum fruits at 15–30° C. by means of 50% aqueous ethanol.

5. As in claim 1, the improvement which consists of extracting Solanum glycoalkaloids from dried Solanum fruits at 15–30° C. by means of 50% aqueous ethanol.

6. As in claim 1, the improvement which consists of extracting Solanum glycoalkaloids from dried *Solanum laciniatum* fruits at 15–30° C. by means of 50% aqueous ethanol.

7. As in claim 1, the improvement which consists of extracting Solanium glycoalkaloids from dried *Solanum aviculare* var. *latifolium* fruits at 15–30° C. by means of 50% aqueous ethanol.

8. As in claim 1, the improvement which consists of extracting Solanum glycoalkaloids from dried *Solanum laciniatum* fruits by means of stirring said fruits with 50% aqueous ethanol at 15–30° C.

9. As in claim 1, the improvement which consists of extracting Solanum glycoalkaloids from dried *Solanum aviculare* var. *latifolium* fruits by means of stirring said fruits with 50% aqueous ethanol at 15–30° C.

10. As in claim 1, the improvement which consists of extracting Solanum glycoalkaloids from Solanum plants by means of 50% aqueous isopropanol.

11. As in claim 1, the improvement which consists of extracting Solanum glycoalkaloids from dried *Solanum laciniatum* fruits at 15–30° C. by means of 50% aqueous isopropanol.

References Cited

Schreiber: Chem. Abstracts I, vol. 60, 14,828d-f, June 1964.

Guseva et al.: Chem. Abstracts, vol. 63, 1656b-e, July 1965.

Boll: Chem. Abstracts III, vol. 59, 1709g–1710d, July 1963.

ALAN L. ROTMAN, Primary Examiner